May 16, 1939. H. S. JANDUS 2,158,455
AUTOMOBILE LOCK
Filed Nov. 18, 1937 2 Sheets-Sheet 1
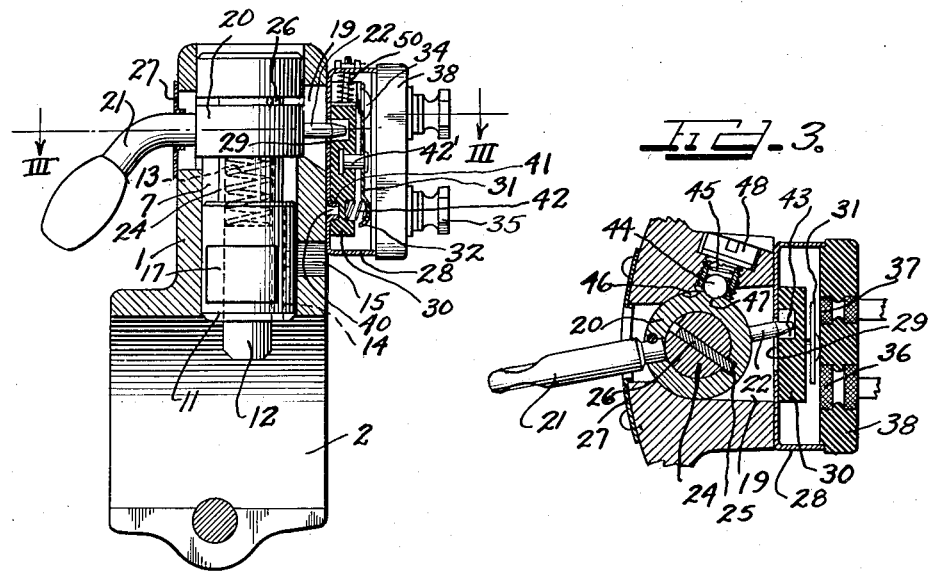
Inventor
HERBERT S. JANDUS.

May 16, 1939.  H. S. JANDUS  2,158,455
AUTOMOBILE LOCK
Filed Nov. 18, 1937   2 Sheets-Sheet 2
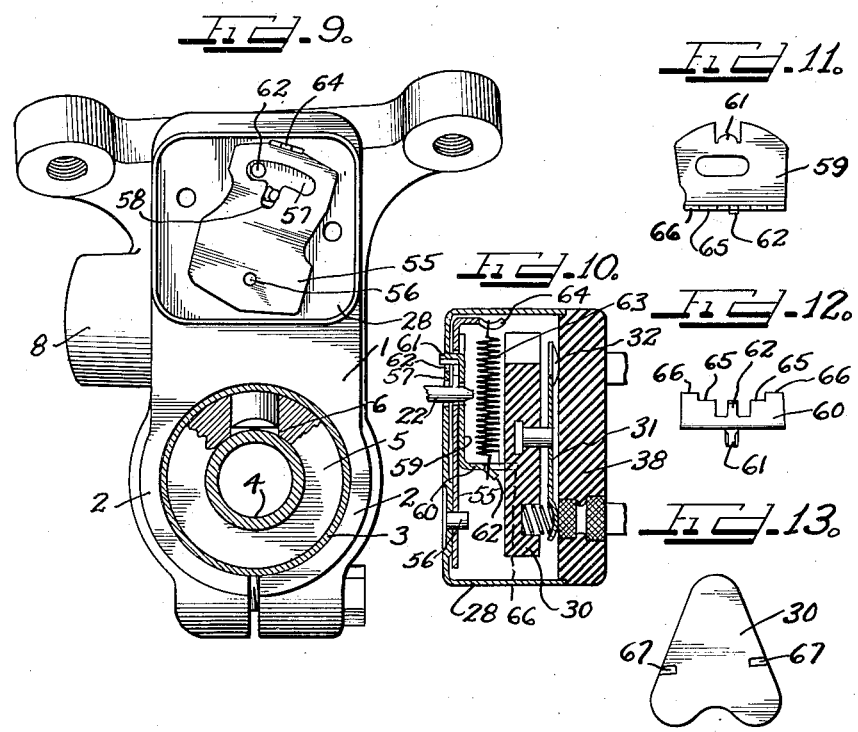
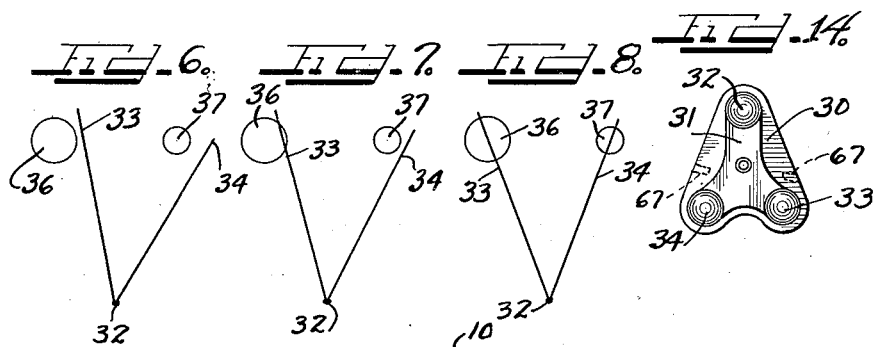
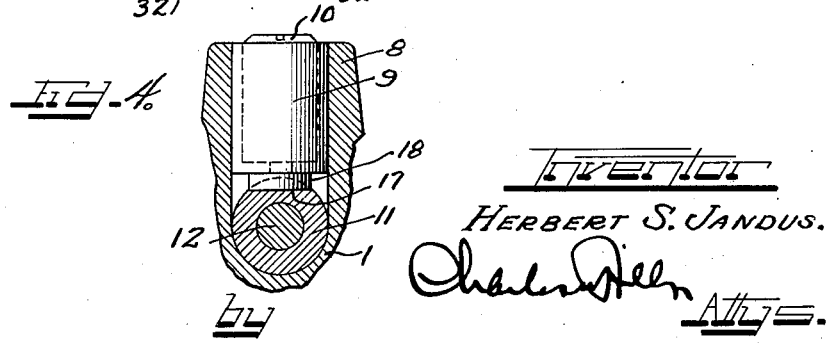
Inventor
HERBERT S. JANDUS.

Patented May 16, 1939

2,158,455

UNITED STATES PATENT OFFICE 2,158,455

AUTOMOBILE LOCK

Herbert S. Jandus, Detroit, Mich., assignor, by mesne assignments, to Houdaille-Hershey Corporation, Detroit, Mich., a corporation of Michigan Application November 18, 1937, Serial No. 175,227

1 Claim. (Cl. 200—42)

This invention relates to automobile locks, particularly to that type of lock which controls the locking of the automobile steering and also the closure and opening of electrical circuits, as for example, the ignition circuit for an automobile.

It is desirable in some types of automobiles to have the lock also control the closure and opening of other circuits besides the ignition circuit, as for example, electrical circuits for indicating devices on the instrument board, as for example the circuit for the oil pressure gauge in which the pressure indication is controlled by current flow through electrical coils.

The invention is of particular advantage in connection with the type of lock now extensively in use in automobiles, in which a non-rotatable locking bolt is axially shiftable to steering locking or unlocking position, and a rotatable ignition switch operating lever has interlocking association with the locking bolt so that the locking bolt cannot be shifted to steering locking position while the ignition is on, and the ignition cannot be turned on until the locking bolt is shifted to unlocking position. With such type of lock, an additional contact could be provided for the ignition switch blade and connected with the instrument circuit when the switch is operated for connecting the ignition with a current supply source such as a battery. However, it is desirable that, as between the ignition circuit and the other circuit, the ignition circuit should be the first to close and the last to open, in order to prevent any comparatively high potential current discharge from the ignition coil through the delicate coil of an indicating instrument connected with the additional switch contact. With the type of locks referred to, the manufacturing tolerances, though small, may permit sufficient backward movement or backlash of the switch lever, particularly when the lock bolt is in steering locking position for permitting engagement of the switch blade with the ignition circuit terminal. This would result in wearing down of the battery, and in some cases burning of the ignition coils. The important object of the invention is therefore to provide improved control of the switch blade by the switch lever so that such loose movement of the switch lever will be compensated for and the switch blade will be accurately shifted for engagement with the ignition contact and the other circuit contact in the desired sequence, and thus eliminate any possibility of injurious current flow through the ignition coils, or running down of the battery.

The invention is shown applied to and incorporated in the lock structure disclosed by the drawings, in which drawings:

Figure 1 is a side elevation of the lock, partly in section;

Figure 2 is a rear view with the cover of the switch box removed;

Figure 3 is a section on plane III—III of Figure 1;

Figure 4 is a section on plane IV—IV of Figure 2;

Figure 5 is an inner side view of the switch box cover;

Figures 6, 7 and 8 diagrammatically show various positions of the switch blade relative to the circuit terminal contacts;

Figure 9 is a view like Figure 2 showing a modified form of toggle mechanism;

Figure 10 is a section through the switch box of Figure 9 showing the toggle arrangement therein;

Figure 11 is a plan view of one of the toggle plates;

Figure 12 is an end view of the toggle plate of Figure 11;

Figure 13 is a rear view of the switch block; and

Figure 14 is a front view of the switch block and switch blade thereon.

The general structure of the locks shown is substantially like that of Van Sickel Patent No. 1,917,620, July 11, 1933.

Briefly describing this lock structure, it comprises a body 1 having the semi-circular arms 2 extending therefrom for clamping the lock structure to the steering column 3 of a steering wheel (not shown) mounted on the steering shaft 4, to which shaft a bushing 5 is secured having a lock bolt receiving notch 6. The body has the longitudinally extending bore 7 which communicates with the bore through a laterally extending boss 8 which receives a lock cylinder casing 9 of a lock cylinder 10 operable by a suitable key.

The lock bolt structure comprises the cylindrical body 11 bored at its outer end to receive the lock bolt 12, which is urged outwardly by a spring 13, the bolt body at its outer end having the longitudinally extending channel 14 for receiving the end of a guide and locking pin 15 secured in the body 1, this pin preventing rotational movement of the lock bolt structure but permitting axial movement thereof into steering locking or unlocking position.

The bolt structure body has the recess 17 in its side for receiving the cam disc 18 at the end of the lock cylinder 10, so that when the lock cylinder is turned the lock structure is shifted axially.

At its inner end the bore 7 is intersected by a cross passage 19 in the lock body, in which cross passage is located the hub 20 of the switch actuating lever structure, the actuating handle 21 for the lever structure extending upwardly and outwardly from the cross passage, and the hub at its lower end having a pin 22 projecting therefrom outwardly through the lower end of the cross passage for cooperation with switch mechanism to be described later. The hub 20 receives and is journaled on the reduced diameter or neck portion 24 of the lock bolt structure body 11, and the hub has the axially extending channel 25 on its inner side for receiving a key 26 projecting from the bolt structure part 24. An escutcheon plate 27 secured to the lock body forms a guide for the switch lever handle and holds the switch lever structure against axial movement. With the arrangement thus far disclosed, the switch lever structure and the lock bolt structure are adapted for interlock, the key 26 on the lock bolt structure being withdrawn from the switch lever structure when the lock bolt is in steering unlocking position so that the switch lever may then be manipulated for switch operation, and the key and the channel being out of register when the switch lever is in switch closing position so that the lock bolt structure cannot then be shifted to steering locking position but can be so shifted only when the switch lever has first been moved to switch opening position.

The switch mechanism comprises a box or housing 28 for the switch parts, the housing seating against the bottom of the lock body across the passage 19. The switch housing bottom has a guide slot 29 through which the switch pin 22 extends, the slot permitting rotary movement of the switch lever structure but assisting in holding said structure against axial movement.

The switch shown comprises a triangular switch block 30 of insulating material for supporting a substantially T-shaped switch blade 31 having at its ends the deflections or contact beads 32, 33 and 34 respectively for engaging with the inner faces of terminal contacts 35, 36 and 37 respectively, which terminals are mounted on a cover plate 38 for the switch housing 28. Screws 39 extend through the cover plate and the switch housing body for threaded engagement with the lock body 1 and for detachably securing the switch structure and assembly to the lock body.

The switch housing body is deflected to form a pivot support 40 for extending into the pivot hole 41 in the switch block in axial alignment with the contact bead 32 of the switch blade. Springs 42 are disposed between the switch block and the switch blade at the contact bead ends, and a stud 42' extending from the switch block guides and limits the movement of the switch blade by the springs, the springs assuring good contact of the contact beads with the contact terminals. The switch blade contact bead 32 is always in engagement with the terminal contact 35, and as the switch block is swung on its pivot 40, the switch blade contact beads 33 and 34 are connected with or disconnected from the terminal contacts 36 and 37 respectively, the swing of the switch block and switch blade resulting from swinging movement of the pin 22 by the switch lever structure.

The lock structure and operation thus far described is substantially the same as that in Patent No. 1,917,620 referred to herein before, except that in the application structure the switch blade is provided with a third contact 34 and the switch housing cover is provided with a corresponding terminal contact 37, this arrangement being desirable in some types of automobiles for control by the lock structure of the electrical controlling circuits of indicating devices on the instrument board, as for example, an oil pressure gauge, such circuit extending from the contact 37, the contact 36 being connected with the ignition coil of the ignition circuit, and the terminal 35 being connected with the current supply source such as the battery for the automobile. Some of these indicating devices on the instrument board are controlled by current flow through delicate coils and the switching arrangement should therefore be such that the ignition circuit should be closed before closure of the instrument circuit, and the instrument circuit should be opened before the ignition circuit is opened, in order to prevent the flow of high potential current impulses from the ignition coil through the instrument circuit which might burn out the coils in such circuit. Having the operation so that the ignition circuit is first to close and last to open, any current back-kick from the ignition coil will be dissipated before such circuit is closed, and after it has been opened.

The switch block is swung by the pin 22 which extends into a slot in the switch block near the upper end thereof. With the type of construction of lock shown, the range of movement of the switch block by the pin is rather limited so that when the switch is fully open as shown diagrammatically by Figure 6, the contact ends 33 and 34 of the switch blade are comparatively close to the terminal contacts 36 and 37 respectively, the contact end 33 being rather close to the ignition terminal contact 36, while the switch contact 34 is a little farther away from the circuit terminal contact 37. When the switch is moved toward closing position, the switch blade will first contact the ignition circuit terminal 36 before the contact 34 engages with the circuit terminal 37 as shown by Figure 7, and when the switch is in full closing position both circuits will be closed as shown in Figure 8.

To yieldingly lock the switch operating lever structure in its switch open or switch closed position, a ball 44 is provided to be pressed by a spring 45 in either of the grooves 46 or 47 provided on the switch lever hub 20, the spring being tensioned by a plug 48 having threaded engagement with the lock body 1.

In the manufacture of the lock, certain tolerances in dimension are permitted for the channel 14 in the lock bolt structure and body, the channel 25 in the lever structure hub 20 and the key 26 in the lock bolt structure, and for other structural parts. These tolerances, although as limited as possible, may be enough to permit backlash or accidental movement of the switch lever structure sufficient to effect enough swing of the switch block for engagement of the switch blade with the ignition circuit terminal, and if this occurs when the lock structure is in steering locking position and the electrical circuits are presumably locked in their open condition, such closure of the ignition circuit will cause the battery to run down and perhaps result in burning of the ignition coil. The important object of the invention is therefore to eliminate the chance for occurrence of any such undesirable circuit closing condition, and this is preferably accomplished by providing arrangement for snap or spring toggle movement of the switch block to its extreme positions after initial movement of the switch block by the switch lever pin past the toggle neutral line. With such toggle means provided, any backlash or loose movement of the switch lever will be unable to effect any circuit change, and the ignition circuit cannot be closed, particularly while the lock structure is in steering locking and circuit open condition.

Referring to Figures 1 to 5, one form of toggle arrangement is shown. A recess or notch 49 is provided in the upper edge of the switch block 30 midway between the switch blade and contact ends 33 and 34, and a toggle link 50 engages at its lower end in this recess and projects through an opening in the top side wall of the switch housing, the switch block then forming the other toggle link. A spring 52 encircles the link 50 and abuts against shoulder 53 at the lower end thereof, the spring at its upper end abutting an abutment block 51 through which the link 50 is slidable and which block has a semi-cylindrical upper surface for engaging in the semi-cylindrical deflection 54 in the switch housing top side wall. With the toggle arrangement, complete movement of the switch block for quick opening or closure of the circuits in proper sequence is always accomplished. The slot 43 is made sufficiently wide so that when lever 21 is swung sufficiently to move the switch block past its middle position, the spring 52 will snap the switch block into "on" or "off" position independently of the lever and without interference.

Figures 9 to 14 show a modified toggle structure and arrangement for the switch block, the lock being otherwise the same as that shown in Figures 1 to 5. In the modified arrangement, one of the toggle levers is in the form of a plate 55 pivoted at its inner end by a pin 56 extending upwardly from the switch housing 28. At its outer end, the lever plate has a transversely extending arcuate slot 57 whose center of curvature is the pivot pin 56, and intermediate the ends of this slot a longitudinal slot 58 extends toward the pivot 56. Through the slot 58 extends the switch lever structure pin 22 so that when the switch lever is swung, the lever plate 55 will also be swung.

The companion toggle lever 59 is in the form of a plate having the rearwardly extending flange 60 at its lower edge, the plate near its other edge, having a forwardly deflected finger 61 for extending through the pivot hole 62 provided in the bottom of the switch box 28 in register with the slot 57 in the lever 55. Part of the flange 60 near its middle portion is cut down to leave a finger 62 for anchoring one end of a coiled spring 63, the other end of the spring being anchored to a finger 64 provided at the outer end of the lever plate 55.

The switch block 30 with the three contact points, 32, 33 and 34 thereon is the same as in the arrangement of Figures 1 to 8, except that the switch block is differently mounted. In the modified arrangement, the flange 60 of the toggle plate 59 is cut away near its end to leave seating shoulders 65 for engagement by the back of the switch block, and tongues 66 for engaging in slots 67 in the back of the switch block so that the switch block will be mounted on the toggle plate 59 with the contact bead 32 in axial alignment with the pivot pin 61 of the toggle plate and so that the switch block will swing with the toggle plate around the axis of this pivot pin.

Figure 9 shows the switch in its off position, the channel 26 in the switch structure hub 20 being at this time in alignment with the key 26 in the lock bolt structure (Figures 1 and 2), so that the lock bolt structure may be shifted to either locking or unlocking position. When the lock bolt structure is now shifted to its steering unlocking position, the switch lever will be released, and upon swing thereof toward circuit closing position, the switch pin 22 will swing the toggle plate 55 in the corresponding direction until the axis of the spring 63 passes through the toggle neutral line through the pivots 56 and 61 of the toggle plates 55 and 59 respectively, and then the spring will become effective to continue the movement of the toggle levers for snap movement of the switch block with the toggle member 59 for closure of the ignition circuit and the instrument circuit. The toggle operation from switch closing position to switch opening position will be the same. Any backlash or loose motion of the switch lever structure will not cause sufficient swing of the toggle plate 55 to bring the spring 63 up to the toggle neutral line so that there is no chance for accidental closure of the ignition circuit. The sequence of circuit closure is the same as in the structure of Figures 1 to 8, the ignition circuit being the first to close and the last to open, injury to the instrument or gauge circuit by current impulse from the ignition coil being thus prevented. When the lock bolt structure has been shifted to steering locking position, the switch lever structure will be locked against operation and all the circuits controlled by the switch structure will be locked in open condition and cannot be closed until the lock bolt structure has been shifted by the key controlled cylinder lock to its steering unlocking position.

I have shown practical and efficient embodiments of the various features of my invention but I do not desire to be limited to the exact construction, arrangement and operation shown and described as changes and modifications are possible which will still come within the scope of the invention.

I claim as follows:

In a lock of the type described, a locking bolt shiftable axially to steering locking or unlocking position, stop means for holding said bolt against rotation, an ignition switch, a rotatable switch actuating lever structure having interlocking connection with said lock bolt so as to be non-rotatable for switch closure when the bolt is in locking position, and spring toggle mechanism between said switch and said lever structure so arranged that any backlash of said lever structure due to manufacturing tolerances in said stop means and interlocking connections will be insufficient to move said toggle mechanism through its neutral line whereby to prevent closure of said switch by said backlash when said lock bolt is in locking position, said lever being operable when said locking bolt is in unlocking position a distance sufficient only to move said switch for passage of the toggle mechanism through its neutral line, said toggle mechanism then effecting independently of said lever the final setting of the switch to circuit opening or closing position and holding the switch in such set position.

HERBERT S. JANDUS.